Patented Jan. 6, 1953

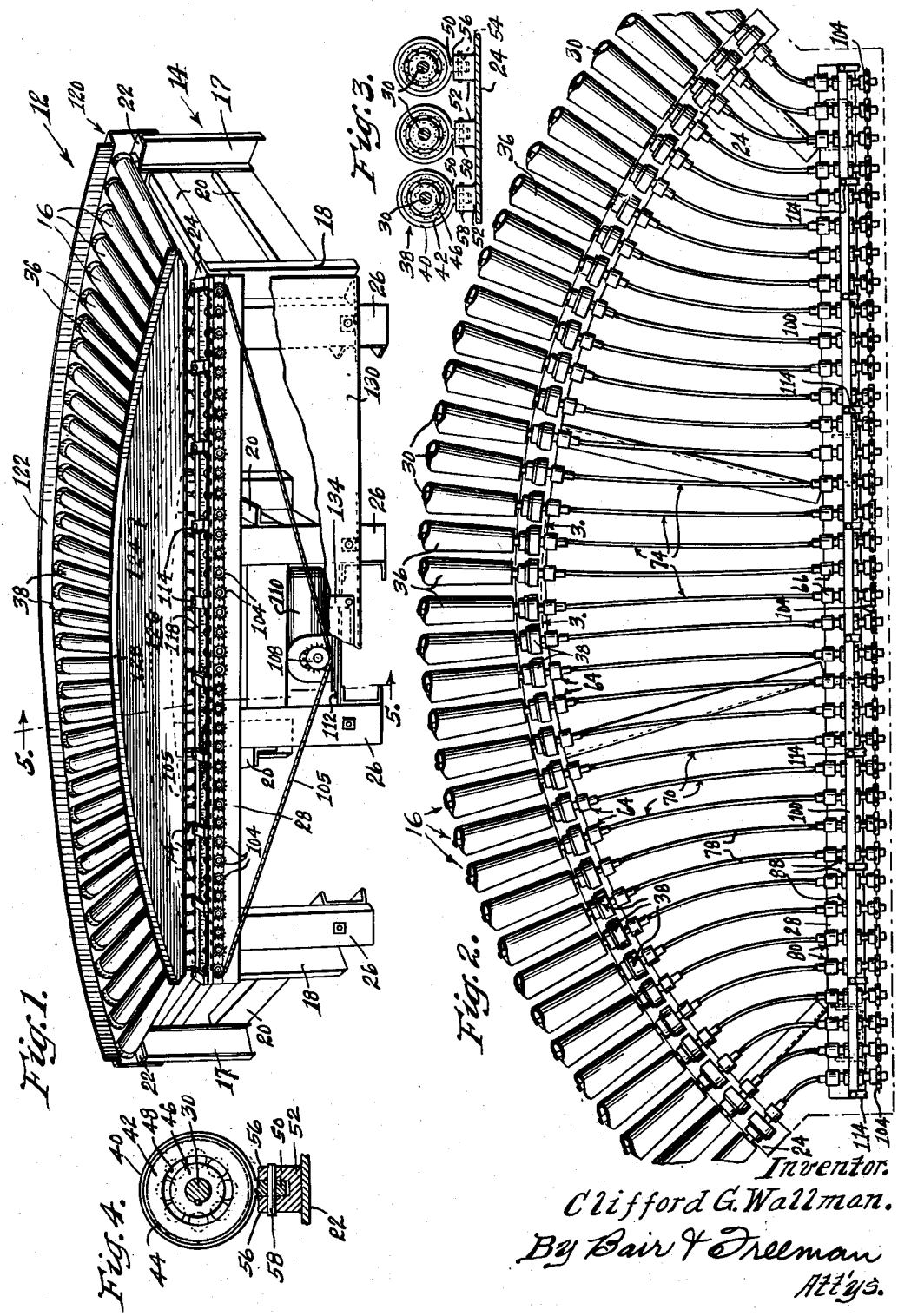

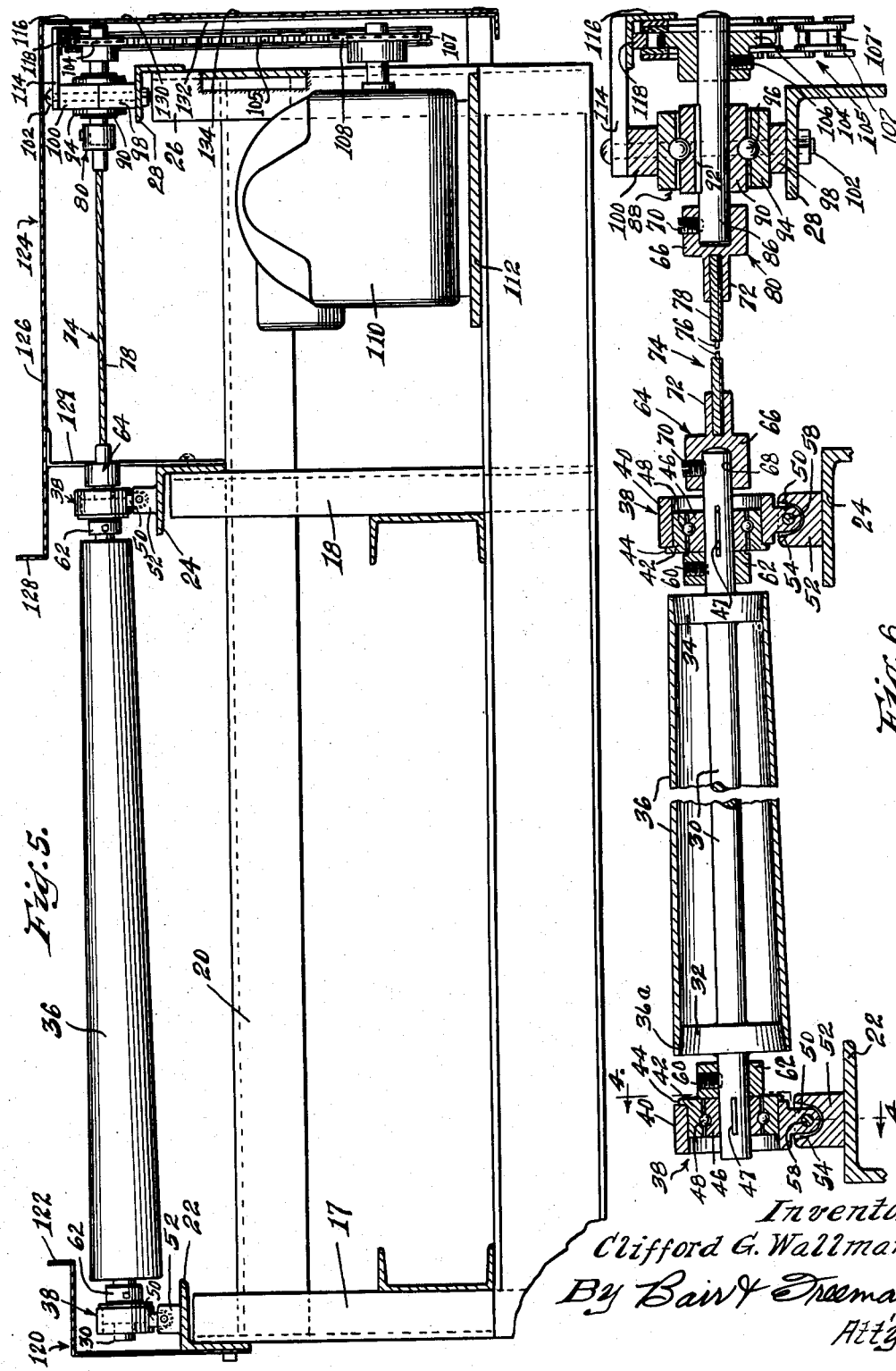

2,624,445

UNITED STATES PATENT OFFICE 2,624,445

UNITARY POWER-DRIVEN ROLLER CONVEYER

Clifford G. Wallman, La Grange, Ill., assignor to The Petersen Oven Company, Franklin Park, Ill., a corporation of Illinois Application November 19, 1949, Serial No. 128,413

7 Claims. (Cl. 198—127)

The present invention relates to a unitary power driven roller conveyor adapted to be interposed in a conveyor system for turning corners or bends, or changing direction of a conveyor which is otherwise straight. The conveyor unit is adapted for conveying various kinds of articles and is of such nature that the articles to be conveyed are merely placed or fed onto the rollers and are conveyed by the rotation of the rollers.

An object of the invention is the provision of a roller conveyor of the nature above referred to, which is in the form of a section adapted to be incorporated as a unit in a conveyor system, whether straight or curved.

Another object of the invention is to provide a power driven conveyor unit comprising a series of spaced apart rollers, arranged generally radially, and wherein all the rollers are driven by a straight line drive.

Still another object of the invention is the provision of a power driven conveyor unit having a series of rollers arranged in an arc and driven by a straight line drive, and by virtue of the straight line drive, a flexible chain can be employed for imparting a positive and uniform drive to the conveyor rollers and the elimination of gear trains is effected.

A further object of the invention is the provision of a curved conveyor unit made up of a series of rollers arranged in an arc and driven by a straight line drive in which the rollers are out of alignment with the straight line drive, and the driving power is transmitted to the rollers by means of flexible drive connections.

A still further object is the provision of a power driven roller conveyor having an arcuate or curved path which is made up as a complete assembly together with the power driving means, and is therefore unitary and readily joined and coordinated with other conveyor sections, eliminating the neccesity of elaborate and expensive operations for interconnecting the various sections.

A still further object is the provision of a power driven curved roller conveyor having rollers disposed in diverging relation with respect to each other, and driven by a straight line drive, whereby a flexible chain can be employed for operating the drive and by reason of the use of the chain, the operation of the conveyor is exceptionally silent.

Another object of the invention is the provision of a power driven roller conveyor in which the rollers diverge with respect to each other and thereby form a curved path, in which the rollers are angled and so arranged that their upper surfaces lie in a common horizontal plane.

And a still further object is to provide a novel and inexpensive journal mounting arrangement for a series of tapered rollers, arranged arcuately with their upper surfaces lying in approximately a horizontal plane.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a perspective view of the conveyor of the present invention with a portion of one of the protective shields removed;

Figure 2 is an enlarged fragmentary plan view of a portion of the conveyor including portions of the rollers and the flexible drive transmitting means therefor;

Figure 3 is an enlarged view taken on line 3—3 of Figure 2;

Figure 4 is a view taken on line 4—4 of Figure 6;

Figure 5 is an enlarged view taken on line 5—5 of Figure 1; and

Figure 6 is an enlarged view of the upper portion of Figure 5 showing certain elements in section.

Referring now in detail to the drawings, the whole conveyor is indicated at 12 in Figure 1 which includes a supporting framework 14 on which are mounted a plurality of power driven tapered rollers 16 arranged in an arcuate path and disposed in positions adjacent the horizontal. The rollers diverge with respect to each other to form the arcuate path as will be readily seen in Figure 1, and the ends of the rollers will be referred to as the outer and inner ends in accordance with the outer and inner defining edges of the arcuate path. The rollers are power driven and articles placed thereon will be conveyed along the conveyor by reason of the rotation of the rollers. The conveyor illustrated in Figure 1 is adapted for interposition in a conveyor system and may be employed for interconnecting straight sections, or other sections. The conveyor of the present invention is adapted to be employed in any situation where the conveyor is intended to turn or change direction.

The frame 14 includes a plurality of supporting legs 17 at the outer edge of the curved path of the conveyor, and a plurality of legs 18 at the inner edge, with appropriate braces or cross members 20 interconnecting the legs 17 and 18. A curved or arcuate angle member 22 is mounted on the tops of the legs 17 as by welding, and similarly a curved angle member 24 is mounted on the tops of the legs 18. An additional set of legs 26 is disposed in substantially a straight line in a position spaced from the legs 19, and mounted on the tops of the legs 26 is a straight angle member 28. The angle members 22, 24 and 28 are adapted for supporting the various elements of the roller conveyor. The brace members 20 or certain of them may be extended to interconnect the legs 26 for imparting rigidity thereto and completing the whole framework. The framework 14 may be of any convenient height for disposing the rollers 16 at the desired level for intercommunicating or cooperating with other sections of the conveyor in which the present apparatus is to be embodied.

Referring particularly to Figures 5 and 6, each of the rollers 16 includes a shaft 30 on which hubs 32 and 34 are rigidly mounted in axial relation. The hub 32 is of greater diameter than the hub 34, the hub 32 being adjacent the outer end of the roller, and the hub 34 being adjacent the inner end. The hubs are preferably tapered slightly so that their peripheral surfaces converge in directions toward each other. Secured on the hubs 32 and 34 is a tubular element 36 which is slightly tapered and defines the shape and size of the roller 16. The outer ends of the inner surface of the tubular member 36 are preferably beveled slightly at 36a and these surfaces directly contact the hubs 32 and 34. If desired, the hubs are forced inwardly into the tubular member sufficiently to establish a firm friction fit between the hubs and the tubular element so that the latter rotates upon roation of the hubs. After the hubs are so positioned, the hubs are welded to the shaft on their outwardly facing surfaces.

Mounted on each end of the shaft 30 is a ball bearing assembly 38 each of which includes an outer ring or collar 40. The bearing proper is inserted in the collar 40 and includes an outer member 42 having a flange 44 adapted to engage the collar 40 in an axial direction, and an inner member 46 keyed to the shaft by means of key 47. The two members 42 and 46 define a race in which are disposed a plurality of bearing balls 48. The collar 40 is provided with a downwardly extending lug 50 adapted to be pivotally mounted in a mounting or supporting bracket 52. The bracket 52 is provided with a cavity 54 in its upper surface defined on opposite sides by wall elements 56 (Figure 4). The lug 50 is inserted in the cavity 54 and the wall elements 56 and lug 50 are provided with aligned holes for the insertion of a pin 58 held in place as by a press fit and providing a pivotal support for the bearing means 38 so that the bearing means can have limited pivotal swinging movement on the pin, the axis of the latter being disposed transverse to the axis of rotation of the roller 16.

The cavities 54 diverge upwardly as viewed in Figure 6 and the diverging side surfaces act as stop means limiting the extent of swinging movement of the bearing means 38 on the pins 58. Secured to the shaft 30 adjacent each of the bearing means 38, by means of a set screw 60, is a set collar 62 in engagement with the respective bearing means for the purpose of taking up axial thrust of the roller and for properly positioning the roller between its bearings.

One of the supporting brackets 52 is mounted on the angle member 22 and the other is mounted on the angle member 24. The angle member 22 is disposed at a lower level than the angle member 24, and as illustrated in Figures 5 and 6 the rollers are thus so disposed that the upper surface of the rollers are horizontal, and all lie in a common horizontal plane; the axes of rotation of the rollers therefore slope downwardly from the inner ends to the outer ends thereof. By reason of the pivotal relationship between the lugs 50 and the brackets 52, a simple and economical arrangement is provided whereby the brackets can be mounted on horizontal members at different heights for supporting the rollers with their axes inclined; this is in contrast with rigidly mounted bearings in the use of which it would be necessary to provide inclined supporting surfaces or inclined bearing supports.

The shaft 30 at the inner end of the roller extends through the respective bearing means 38 a distance sufficient to receive an adapter indicated generally at 64. The adapter 64 includes a main body portion 66 having a bore 68 therein for receiving the end of the shaft 30. A set screw 70 is threaded through a tapped hole in the body member and engages the shaft for securing the adapter to the shaft for rotation therewith. A tubular element 72 which is preferably formed integral with the body portion 66 is adapted to receive one end of a flexible shaft 74. The flexible shaft 74 may be of any preferred construction, but one form of construction is illustrated in Figure 6 in which a central core member 76 is provided. The core member 76 is of course flexible in itself and consists of a straight single piece wire; flexible strands 78 are wrapped around the core 76 and may consist of several layers wrapped in opposite directions. As mentioned above, one end of the flexible shaft 74 is inserted in the tubular element 72 and the tubular element is crimped as by center punching for fixedly securing the flexible shaft in the tubular element. Any preferred means may be employed for connecting the shaft to the tubular element. The other end of the flexible shaft is secured in an adapter 80 which is similar to the adapter 64, and the flexible shaft is secured in the same manner as just described in connection with the adapter 64. The adapter 80 is secured to a stub shaft 86 mounted in a bearing means 88 similar in construction to the bearing means 38 and including an inner bearing member 90 keyed to the shaft by means of key 92 and an outer bearing member 94, the two bearing members forming a race for bearing balls 96.

One shaft 86 is provided for each roller 16. The bearing means 88 are mounted on the straight angle member 28, and the respective bearing members 88 and the shafts 86 are therefore disposed in a straight line as illustrated most clearly in Figure 2. The means for mounting the bearing members 88 includes a pair of transverse bars 98 and 100, the lower one being mounted directly on the angle member 28 and the upper one superimposed on the lower one, the two bars having cavities for receiving the bearing members 88. Bolts 102 are inserted through holes in alignment in the two transverse bars and through holes in the angle member 28 for securing the bars and the bearing members to the angle member 28.

On the outer end of each shaft 86 is a sprocket 104, secured thereon by means of a set screw 106. The sprockets 104 are of course in alignment since the shafts 86 and their mounting means are in alignment, and of course the upper peripheral surfaces of the sprockets are in a straight line. For purposes of interpreting the claims it will be noted that the shafts 86 are disposed with their axes of rotation parallel with each other.

Since the rollers 16 are disposed in an arcuate path and the sprockets 104 are disposed in a straight line, the flexible shafts 74 are of different lengths to accommodate the different distances between the rollers and the respective sprockets, as illustrated in Figure 2. At the ends of the conveyor, the shafts 74 are shorter, and the degree of misalignment between the rollers and the sprockets is progressively increased from the middle to the ends of the conveyor, and accordingly the flexible shafts are disposed in sharper bends at the ends than at the middle.

An endless flexible drive chain 105 is employed for rotating the driving sprockets 104. The chain is made up of a plurality of pairs of links 107 and interconnecting rollers 107'. The chain 105 has an upper run in meshing engagement with all of the sprockets 104 along the upper peripheral surfaces of the sprockets, and a bottom run in meshing engagement with a sprocket 108 secured to the drive shaft of an electric motor 110 which may be mounted in any convenient place such as on a platform 112 which in turn is supported by the structural members 20 of the framework 14.

Secured to the upper transverse bar 100 in spaced relation therealong is a plurality of clamp bars 114 secured thereto as by means of bolts which may be the same bolts 102 which secure the bars 98 and 100 to the angle member 28. The clamp bars 114 extend outwardly from the bars 98 and 100 and secured to the outer ends thereof is a hold down angle member 116. The angle member 116 has a horizontal leg directly connected to the clamp bars and a vertical leg extending vertically over the outside surface of the drive chain 105; the horizontal leg of the hold down angle member 116 is disposed directly over the sprockets 104 and of course the upper run of the chain. A guide bar 118 is secured to the under surface of the horizontal leg of the hold down angle member 116, extending the full length thereof. The guide bar 118 is disposed between the links 107 of the chain and in substantial engagement with the rollers 107' of the chain. The guide bar 118 thus retains the chain in engagement with all of the driving sprockets 104 and prevents the chain from possibly riding up on the sprockets.

A guard or shield 120 is secured to the angle member 22 at the outer edge of the curved path of the conveyor, and extends upwardly and over the bearing members 38, and has an inner curved, vertical flange 122 over the outer ends of the rollers 16. Similarly a guard or shield 124 is provided, having a horizontal portion 126 disposed over the inner ends of the rollers and the flexible shafts and their supporting and driving means. The portion 126 is turned up at 128 to form a curved flange positioned over the inner ends of the rollers. The upturned flanges 122 and 128 define and limit the path for guiding articles or materials conveyed on the conveyor rollers. The portion 126 is supported by a plurality of brackets 129 positioned between certain flexible shafts 74 and secured to the angle member 24. The guard 124 also has a downturned portion 130 covering most of that side of the machine, the portion 130 having an opening 132 for affording access to the motor 110, the opening being closed by a plate or panel 134 which may be removably secured to the portion 130.

From the foregoing it will be seen that upon operation of the electric motor 110 the chain 106 is actuated which rotates all of the driving sprockets 104 which in turn rotate the flexible shafts 74 and thereby rotate the rollers. The flexible shafts effectively transmit the driving force from the driving sprockets to the rollers notwithstanding the misalignment therebetween.

The peripheral speed of the large end of the rollers is greater than that of the inner end and the result is that articles placed on the conveyor are carried in substantially an arcuate path by the rollers. The flanges 122 and 128 assure that the articles will be retained on the rollers if there should be any tendency for the articles to migrate off of the rollers.

The apparatus herein disclosed is a unitary or "package" section conveyor, which can be interposed in a longer conveyor without the necessity of elaborate interconnecting devices or operations. A conveyor section can be positioned adjacent each end of the curved conveyor section of the present invention and articles conveyed from one of the other sections onto the present section and then onto the final section.

By reason of the straight line arrangement of the driving sprockets, a single flexible chain can be employed for driving the sprockets and expensive and cumbersome gear trains are eliminated as well as the objectionable noise accompanying gear trains. The chain employed in the present instance operates without objectionable noise.

The mechanism herein disclosed results in an inexpensive construction, in which the rollers are power driven and the articles conveyed are uniformly fed in a true arcuate path, as distinguished from a mechanism employing cylindrical rollers, or a gravity type conveyor having the upper surface of the rollers inclined.

While I have herein shown and described a preferred form of my invention, manifestly it is susceptible of modification and rearrangement of the parts without departing from the spirit and scope thereof. I do not, therefore, wish to be understood as limiting my invention to the precise form herein disclosed, except as I may be so limited by the appended claims.

I claim as my invention:

1. In conveyor mechanism of the character disclosed, a supporting frame, a plurality of rollers rotatably mounted on said frame, a plurality of driving elements rotatably mounted on said frame, said driving elements being individual to said rollers respectively, said driving elements being disposed with their axes of rotation parallel, the axes of rotation of said rollers being out of alignment with the respective axes of rotation of said driving elements, a plurality of flexible drive transmitting means interconnecting said respective driving elements and rollers, and means for rotating said driving elements.

2. In conveyor mechanism of the character disclosed, a supporting frame, a plurality of rollers rotatably mounted on said frame, said rollers being disposed in side-by-side relation in an arcuate path, the axes of rotation of adjacent rollers being thereby divergent with respect to each other, a plurality of driving elements rotatably mounted on said frame, said driving elements being individual to said rollers respectively, said driving elements being disposed with their axes of rotation parallel, a plurality of flexible drive transmitting means interconnecting said respective driving elements and rollers, and means for rotating said driving elements.

3. In conveyor mechanism of the character disclosed, a supporting frame, a plurality of rollers rotatably mounted on said frame, said rollers being disposed in side-by-side relation in an arcuate path, the axes of rotation of adjacent rollers being thereby divergent with respect to each other, a plurality of driving sprockets rotatably mounted on said frame, said driving sprockets being individual to said rollers respectively, said driving sprockets being disposed with their axes of rotation parallel and said driving sprockets being in a plane extending transversely of their axes, a plurality of flexible drive transmitting means interconnecting said respective driving sprockets and rollers, and single chain means in engagement with all of said sprockets, said chain means being adapted for connection with power means for rotating said sprockets.

4. In conveyor mechanism of the character disclosed, a supporting frame, a plurality of rollers rotatably mounted on said frame, said rollers being disposed in side-by-side relation in an arcuate path, the axes of rotation of adjacent rollers being thereby divergent with respect to each other, a plurality of driving sprockets rotatably mounted on said frame, said driving sprockets being individual to said rollers respectively, said driving sprockets being disposed with their axes of rotation parallel and said driving sprockets being in a straight line extending transversely of their axes, a plurality of flexible drive transmitting means interconnecting said respective driving sprockets and rollers, single chain means in engagement with all of said sprockets, and guide means for retaining said chain means in engagement with said sprockets, said chain means being adapted for connection with power means for rotating said sprockets.

5. In a conveyor of the character disclosed, a supporting frame, a plurality of tapered rollers disposed with their upper surfaces disposed in a common horizontal plane, bearing means on each end of each roller, mounting means pivotally connected to each bearing means on an axis disposed transverse to the axis of rotation of the respective roller, said mounting means being secured to said frame for supporting the rollers thereon, a plurality of driving elements rotatably mounted on said frame, said driving elements being individual to said rollers respectively, a plurality of flexible means interconnecting each driving element and a respective roller, and means for rotating said driving elements.

6. In a conveyor of the character disclosed, a supporting frame, a plurality of tapered rollers, bearing means on each end of each roller, mounting means pivotally connected to each bearing means on an axis disposed transverse to the axis of rotation of the respective roller, said mounting means being secured to said frame for supporting the rollers thereon, said rollers being disposed in side-by-side relation in an arcuate path with the small-diameter ends of the rollers disposed at the inner edge of the path, adjacent rollers diverging with respect to each other in directions extending toward the outer edge of the path, and the large-diameter ends of the rollers being disposed at the outer edge of the path, said rollers being so disposed that their upper surfaces lie in a common horizontal plane, a plurality of driving elements rotatably mounted on said frame, said driving elements being individual to said rollers respectively, a plurality of flexible shafts interconnecting each driving element and a respective roller, and means for rotating said driving elements.

7. In conveyor mechanism of the character disclosed, a supporting frame, a plurality of rollers rotatably mounted on said frame, said rollers being disposed in positions adjacent the horizontal for supporting articles on their peripheral surfaces, said rollers being disposed in side-by-side relation in an arcuate path, the axes of rotation of adjacent rollers being thereby divergent with respect to each other, a plurality of driving sprockets rotatably mounted on said frame, said driving sprockets being individual to said rollers respectively, said driving sprockets being disposed with their axes of rotation parallel and in a horizontal straight line extending transversely of their axes, flexible drive transmitting means interconnecting said driving sprockets and the respective rollers, single chain means in engagement with all of said sprockets on the upper peripheral surfaces thereof, a horizontal guide member overlying said sprockets and in engagement with said chain means, said guide member being operative for retaining said chain means in engagement with said sprockets, said chain means being adapted for connection with power means for rotating said sprockets.

CLIFFORD G. WALLMAN.

REFERENCES CITED

The following references are of record in the file of this patent:

UNITED STATES PATENTS

| Number | Name | Date |
|---|---|---|
| 353,124 | Dickson | Nov. 23, 1886 |
| 1,677,999 | Boax et al. | July 24, 1928 |
| 1,756,653 | McArthur | Apr. 29, 1930 |
| 1,785,594 | Paisley | Dec. 16, 1930 |
| 1,896,150 | Zademach | Feb. 7, 1933 |
| 1,959,157 | Eggleston | May 15, 1934 |
| 2,070,043 | Cutler | Feb. 9, 1937 |
| 2,410,996 | Patterson | Nov. 12, 1946 |